US011449789B2

(12) United States Patent
Forman et al.

(10) Patent No.: US 11,449,789 B2
(45) Date of Patent: Sep. 20, 2022

(54) SYSTEM AND METHOD FOR HIERARCHICAL CLASSIFICATION

(71) Applicant: ENTIT SOFTWARE LLC, Sanford, NC (US)

(72) Inventors: George Forman, Port Orchard, WA (US); Hila Nachlieli, Haifa (IL)

(73) Assignee: MICRO FOCUS LLC, Santa Clara, CA (US)

( * ) Notice: Subject to any disclaimer, the term of this patent is extended or adjusted under 35 U.S.C. 154(b) by 984 days.

(21) Appl. No.: 16/077,591

(22) PCT Filed: Feb. 16, 2016

(86) PCT No.: PCT/US2016/018024
§ 371 (c)(1),
(2) Date: Aug. 13, 2018

(87) PCT Pub. No.: WO2017/142510
PCT Pub. Date: Aug. 24, 2017

(65) Prior Publication Data
US 2019/0057321 A1    Feb. 21, 2019

(51) Int. Cl.
*G06N 20/00*    (2019.01)
*G06F 16/00*    (2019.01)
(Continued)

(52) U.S. Cl.
CPC ............. *G06N 20/00* (2019.01); *G06F 16/00* (2019.01); *G06F 16/285* (2019.01); *G06K 9/00* (2013.01);
(Continued)

(58) Field of Classification Search
None
See application file for complete search history.

(56) References Cited

U.S. PATENT DOCUMENTS 6,684,202 B1    1/2004   Humphrey et al.
9,053,392 B2    6/2015   Yang et al.
(Continued)

FOREIGN PATENT DOCUMENTS

CN    106156766 A  * 11/2016   ............... G06K 9/00
CN    104281851 B  * 11/2017   ........... G06K 9/4671
(Continued)

OTHER PUBLICATIONS

Bi, W. et al.; "Mandatory Leaf Node Prediction in Hierarchical Multilabel Classification"; Apr. 23, 2014; 9 pages.
(Continued)

*Primary Examiner* — Mohammed Rachedine
(74) *Attorney, Agent, or Firm* — Sheridan Ross P.C.

(57) ABSTRACT

An example method comprises performing for each class from a plurality of classes: constructing binary training set for the class, the binary training set including labeled cases for that class from the main training set other labeled cases from the main training set; training classifier for the class on the binary training set; computing a local calibration threshold using scores of the labeled cases in the binary training set; and adjusting all scores of the label cases in the binary training set with the local calibration threshold to meet a global decision threshold. The method also comprises determining, with the processor, a global hierarchical calibration threshold by using the adjusted scores for all classes to optimize a performance measurement of all trained classifiers. The method further comprises classifying, with the processor, a new case by using a previously trained classifier, a local calibration threshold, and the global hierarchical calibration threshold.

15 Claims, 6 Drawing Sheets

(51) Int. Cl.
*G06F 16/28* (2019.01)
*G06K 9/00* (2022.01)
*G06K 9/62* (2022.01)

(52) U.S. Cl.
CPC ......... *G06K 9/6219* (2013.01); *G06K 9/6262* (2013.01); *G06K 9/6292* (2013.01)

(56) References Cited

U.S. PATENT DOCUMENTS

| | | | |
|---|---|---|---|
| 9,489,635 B1* | 11/2016 | Zhu | G06V 10/987 |
| 9,811,780 B1* | 11/2017 | Aradhye | G06N 20/00 |
| 10,360,220 B1* | 7/2019 | Gupta | G06N 5/045 |
| 2004/0111453 A1 | 6/2004 | Harris et al. | |
| 2006/0047614 A1 | 3/2006 | Cohen et al. | |
| 2010/0161527 A1 | 6/2010 | Sellamanickam et al. | |
| 2011/0040706 A1 | 2/2011 | Sen et al. | |
| 2014/0074760 A1 | 3/2014 | Boldyrev et al. | |
| 2015/0102216 A1 | 4/2015 | Roder et al. | |
| 2017/0011294 A1* | 1/2017 | Jagannathan | G06V 10/94 |
| 2017/0046510 A1* | 2/2017 | Chen | G06F 21/552 |
| 2017/0068903 A1* | 3/2017 | Hakkani-Tur | G06N 20/00 |
| 2017/0083825 A1* | 3/2017 | Battersby | G06N 20/00 |
| 2017/0091653 A1* | 3/2017 | Jat | H04L 51/32 |

FOREIGN PATENT DOCUMENTS

| | | | | |
|---|---|---|---|---|
| CN | 104299003 B | * | 8/2018 | G06K 9/6227 |
| WO | WO-2016167796 A1 | * | 10/2016 | G06K 9/6227 |

OTHER PUBLICATIONS

International Searching Authority., International Search Report and Written Opinion dated Nov. 14, 2016 for PCT Application No. PCT/US2016/018024 Filed Feb. 16, 2016, 10 pages.

Raaijmakers, S., et al., "Classifier Calibration for Multi-Domain Sentiment Classification"; In: the Proceedings of the Fourth International AAAI Conference on Weblogs and Social Media, pp. 311-314, May 16, 2010 (http://www.aaai.org/ocs/index.php/ICWSM/ICWSM10/paper/view/1494) See pp. 311 and 314.

Ramirez-Corona, M. et al.; "Chained Path Evaluation for Hierarchical Multi-label Classification"; Jul. 10, 2014; 6 pages.

* cited by examiner

SYSTEM AND METHOD FOR HIERARCHICAL CLASSIFICATION

CLASSIFICATION

Classification of data is typically the task of assigning instances or cases to pre-defined classes (e.g., deciding whether a particular patient record can be associated with a specific disease). In other words, classification is the process of classifying data according to shared qualities or characteristics and identifying to which of a set of categories or classes a new case/instance belongs, on the basis of a training set of data. Data classification has been widely used in many organizations in recent years.

DETAILED DESCRIPTION OF SPECIFIC EXAMPLES

As mentioned above, classification of data has become increasingly popular in recent years. Many organizations use various classification methods and techniques to help them analyze and classify different types of data (e.g., customer surveys, customer support logs, engineer repair notes, system logs, etc.). One of their main goals is to assign a plurality of data cases to pre-defined classes. As used herein, the term "case" may refer to a single row of data in a dataset or a single record that is to be classified (e.g., document, email, word, numerical value, etc.). As used herein, the terms "class" and "category" are to be used interchangeably and refer to various classification labels used to classify a set of cases in a way that cases in the same class are more similar to each other than to those in other class.

In some business settings, organizations may need automated classifiers that have various important properties. For example, there is a need of classifiers to simultaneously: (1) recognize categories they know about; (2) perform hierarchical classification (i.e., classify cases based on their hierarchical relationship); (3) perform multi-label classification (i.e., classify cases into more than one classes where applicable); (4) perform semi-supervised classification (i.e., classify cases that are outside of the labeled cases in a training data set); and (4) "balk" at (i.e., abstain from classifying) cases that do not belong to the known categories that the classifier has training data for. In other words, it may be beneficial that classifiers have the ability to simultaneously perform different classification tasks. As used herein, the term "balking" refers to the refusal of an automated classifier to classify cases into some known classes. For example, in IT products problem management, there may be multi-class classifiers to recognize different types of product issues or cases (e.g., broken screen, virus issue, etc.), but there may be other cases/issues that were not (yet) defined by the classifier, for which the classifier should answer "none of the above."

In many situations, a classifier may be trained by using a learning model and applying learning algorithms on a training dataset (i.e., a subset of the main dataset that may include examples of specific classes). Thus, given a set of training examples/cases, each marked for belonging to a specific class, a training algorithm may train or build a classifier that may assign new examples/cases into one category or the other. As used herein, "a classifier" refers to both to the training model built by a training algorithm based on a training dataset and to the actual trained classifier that is generated based on the training model. In one example, the classifier may be a "soft" classifier (e.g., a probabilistic or scoring classifier). In another example, the classifier may be a non-probabilistic classifier (i.e., "hard classifier").

Existing techniques may not be sufficient to create a classifier that simultaneously performs different classification tasks and balks at cases that do not belong to the known classes. In this regard, according to examples, techniques for training and optimizing a classifier that can perform various classification tasks are disclosed herein. In one example, the proposed techniques train an effective semi-supervised classifier that is able to classify items into the known categories while performing hierarchical and/or multi-label classification as well as provides balking capability. For instance, this is a common situation in building classifiers for customer support, where an organization only has training cases for some of the existing problems, and there are many other types of problems in the large dataset that needs to be classified. As used herein, the term "data corpus" refers to a large collection of data from which a main training set is generated in order to train a classifier.

Therefore, while traditional classification is aimed towards classification problems, the proposed techniques concentrate on both effective simultaneous classification based on different characteristics and balking. In one example, a processor may perform a plurality of operations for each class of a plurality of classes: 1) construct a binary training set for the class, the binary training set including labeled cases for that class from the main training set and other labeled cases from the main training set; 2) train a classifier for the class on the binary training set; 3) compute a local calibration threshold using classifier scores of the labeled cases in the binary training set; and 4) adjust all scores of the labeled cases in the binary training set with the local calibration threshold to meet a global decision threshold. The processor may determine a global hierarchical calibration threshold by using the adjusted scores for all classes to optimize a performance measurement of all trained classifier. Finally, the processor may classify a new case by using a previously trained classifier, a local calibration threshold, and the global hierarchical calibration threshold.

In the following detailed description, reference is made to the accompanying drawings, which form a part hereof, and in which is shown by way of illustration specific examples in which the disclosed subject matter may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. Furthermore, the term "based on," as used herein, means "based at least in part on." It should also be noted that a plurality of hardware and software based devices, as well as a plurality of different structural components may be used to implement the disclosed methods and devices.

Figure 1:
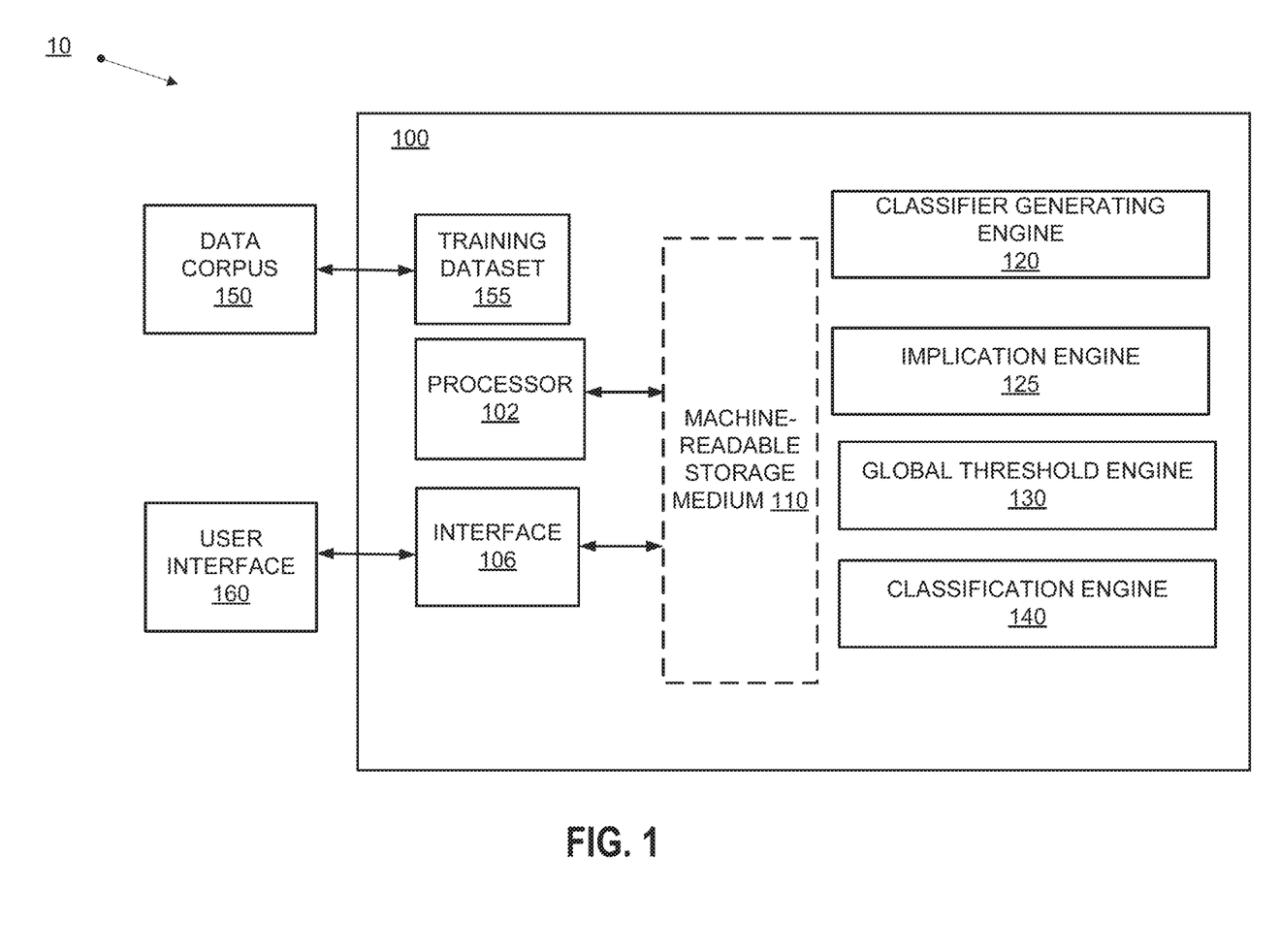
FIG. 1 is a schematic illustration of an example system for training and optimizing a classifier and classifying a new case in accordance with an implementation of the present disclosure.

Referring now to the figures, FIG. 1 is a schematic illustration of an example system 10 for training and optimizing a classifier and classifying a new case. The illustrated system 10 is capable of carrying out the techniques described below. As shown in FIG. 1, the system 10 is depicted as including at least one computing device 100 (e.g., application server, compute node, desktop or laptop computer, smart phone, etc.). In the embodiment of FIG. 1, computing device 100 includes a processor 102, an interface 106, and a machine-readable storage medium 110. Although only computing device 100 is described in details below, the techniques described herein may be performed by several computing devices or by engines distributed on different devices. Thus, the computing device 100 may or may not be an independent computing device. The computing device 100 may include additional components and some of the components depicted therein may be removed and/or modified without departing from a scope of the system that allows for carrying out the functionality described herein.

In one example, the computing device 100 (or another computing device) may communicate with a data corpus 150 and with an interactive user interface 160 (e.g., graphical user interface). The data corpus 150 may include different types of data that is to be classified. A main training set 155 may be generated from the data corpus 150 and may be used to train and test at least one classifier described in additional details below. The data in the data corpus 150 may include text-like data, categorical data, numerical data, structured data, unstructured data, or any other type of data. The device 100 may receive an incoming data stream of data objects from the data corpus 150.

In one example, the data in the data corpus 150 may be in structured form. For example, the data may be represented as a linked database, a tabular array, an excel worksheet, a graph, a tree, and so forth. In some examples, the data in the data corpus 150 may be unstructured. For example, the data may be a collection of log messages, snippets from text messages, messages from social networking platforms, and so forth. In some examples, the data may be in semi-structured form.

In another example, the data in the data corpus 150 may be represented as an array. For example, columns may represent features of the data, whereas rows may represent data elements. For example, each row may represent a traffic incident, whereas columns may represent features associated with each traffic incident, including weather conditions, road conditions, time of day, date, a number of casualties, types of injuries, victims' ages, and so forth.

The computing device 100 may implement engines 120-140 (and components thereof) in various ways, for example as hardware and programming. Each of the engines 120-140 may include, for example, a hardware device including electronic circuitry for implementing the functionality described below, such as control logic and/or memory. In addition or as an alternative, the engines 120-140 may be implemented as any combination of hardware and software to implement the functionalities of the engines. The programming for the engines 120-140 may take the form of processor-executable instructions stored on a non-transitory machine-readable storage medium and the hardware for the engines 120-140 may include a processing resource to execute those instructions. A processing resource may include a number of processors and may be implemented through a single processor or multi-processor architecture. In an alternative example, engines 120-140 may be distributed between the computing device 100 and other computing devices. It is to be understood that the operations described as being performed by the engines 120-140 of the computing device 100 that are related to this description may, in some implementations, be performed by external engines (not shown) or distributed between the engines of the computing device 100 and other electronic/computing devices.

Processor 102 may be central processing unit(s) (CPUs), microprocessor(s), and/or other hardware device(s) suitable for retrieval and execution of instructions (not shown) stored in machine-readable storage medium 110. Processor 102 may fetch, decode, and execute instructions to identify different groups in a dataset. As an alternative or in addition to retrieving and executing instructions, processor 102 may include electronic circuits comprising a number of electronic components for performing the functionality of instructions.

Interface 106 may include a number of electronic components for communicating with various devices. For example, interface 106 may be an Ethernet interface, a Universal Serial Bus (USB) interface, an IEEE 1394 (Firewire) interface, an external Serial Advanced Technology Attachment (eSATA) interface, or any other physical connection interface suitable for communication with the computing device. Alternatively, interface 106 may be a wireless interface, such as a wireless local area network (ULAN) interface or a near-field communication (NFC) interface that is used to connect with other devices/systems and/or to a network. The user interface 160 and the computing device 100 may be connected via a network. In one example, the network may be a mesh sensor network (not shown). The network may include any suitable type or configuration of network to allow for communication between the computing device 100, the user interface 160, and any other devices/systems (e.g., other computing devices, displays), for example, to send and receive data to and from a corresponding interface of another device.

In one example, the classifier generating engine 120 may train a classifier for a plurality of classes in a main training set. For example, the classifier generating engine 120 may receive a main training set of cases 155 (e.g., from the data corpus 150), where each of a plurality of classes is associated with a set of labeled cases in the main training set 155. In one implementation, a user may label cases (e.g., logs, documents, etc.) from the data 150 corpus to be included in the main training set 155. In other words, the user may provide example cases for classes/categories in the data corpus 150 that may be used to train classifiers and classify any additional cases from the data corpus 150 or any other dataset.

In one implementation, the classifier generating engine 120 may perform the following operations for each class from a plurality of classes. As noted above, each class is associated with a set of labeled cases in a main training set. The classifier generating engine 120 may: 1) generate a binary training set for the class, the binary training set including labeled cases for that class from the main training set and other labeled cases from the main training set; 2) train a classifier for the class on the binary training set; 3) score the cases in the binary training set excluding any unlabeled cases; 4) compute a local calibration threshold using scores of the labeled cases in the binary training set; and 5) adjust all scores of the labeled cases in the binary training set with the local calibration threshold to meet a global decision threshold.

The implication engine 125 may, for each class in the main training set, determine a set of other classes that are implied by that class. In other words, the implication engine 125 may determine the classes implied by a specific class after a case is classified as being associated with that class (e.g., if the case is classified under class A1 that may imply class A, which may be directly above A1 in a classification hierarchy). Various techniques may be used to perform the implication. In one implementation, the implications may be derived by examining only the hierarchy of classes. In another implementation, the implications may be derived by examining only the labeled cases, looking for any rules that consistently imply another class, for example, all cases labeled with class X may also be labeled with class Y (e.g. X="marines", Y="soldiers"). In another implementation, the implication rules may be derived from examining both the class hierarchy as well as the labeled training set.

The global hierarchical calibration threshold engine 130 may determine a global hierarchical calibration threshold by using the adjusted scores for all classes and may optimize a performance measurement of all trained classifiers. In one example, the engine 130 may consider several global hierarchical calibration thresholds and may iteratively perform for a considered global hierarchical calibration threshold: 1) adjust all scores of the labeled cases by the considered global hierarchical calibration threshold; 2) apply the implications for each adjusted class with a score that exceeds the global decision threshold; and 3) determine the performance measurement (e.g. accuracy, micro-averaged F-measure, macro-averaged F-measure, etc.) of the main training set based on the considered hierarchical calibration threshold. The engine 130 may further select a hierarchical calibration threshold with the highest performance measurement on the main training set.

The classification engine 140 may classify a new case by using a previously trained classifier, a local calibration threshold (e.g., of the selected classifier), and the global hierarchical calibration threshold. In one example, when classifying a new case, the classification engine 140 may iteratively perform for each class from the plurality of classes: 1) calculate a score for the new case by applying the classifier for the class to the new case; 2) perform a local calibration by adjusting the score for the new case by the local calibration threshold for the class; and 3) perform a global calibration by adjusting the score for the new case by the global hierarchical calibration threshold. The engine 140 may further apply the set of classes that are implied by each predicted class whose adjusted score exceeds the global decision threshold; output a calibrated score for each class, the score being associated with the new case; and compare the calibrated score of the new case for each class to the global decision threshold. The engine 140 may identify at least one class for the new case when the calibrated score for the class is greater than or equal to the global decision threshold. In other words, based on the results, the engine 140 may output a plurality of classes associated with the new case, if/when the new case is relevant to several classes. If none of the adjusted scores exceeds the global decision threshold, the new case is not predicted to belong to any of the known classes, i.e. the classifier "balks"—refusing to admit the case to any known classes.

Figure 2:
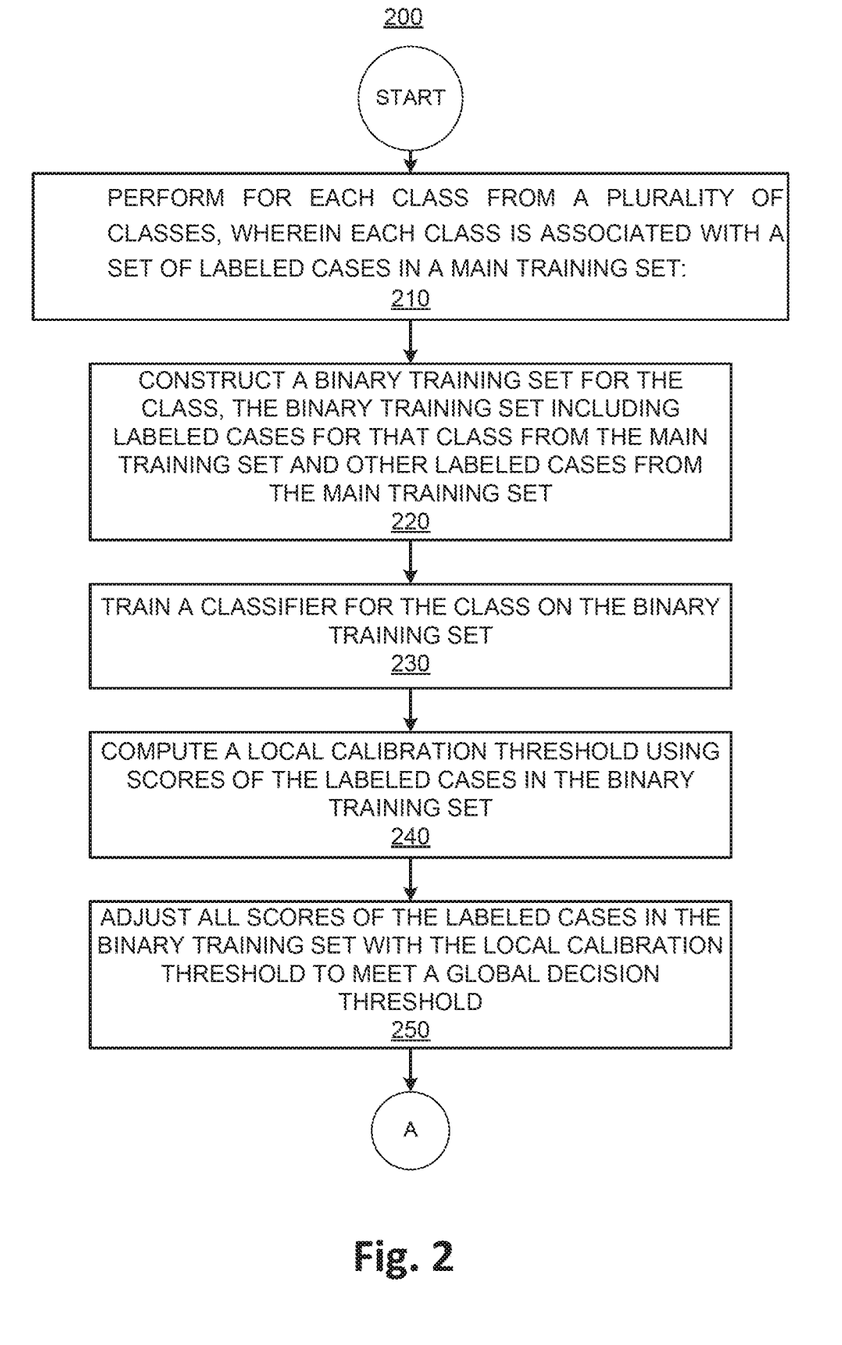
FIGS. 2-3 illustrate a flowchart showing an example of a method for training and optimizing a classifier and classifying a new case in accordance with an implementation of the present disclosure.
Figure 3:
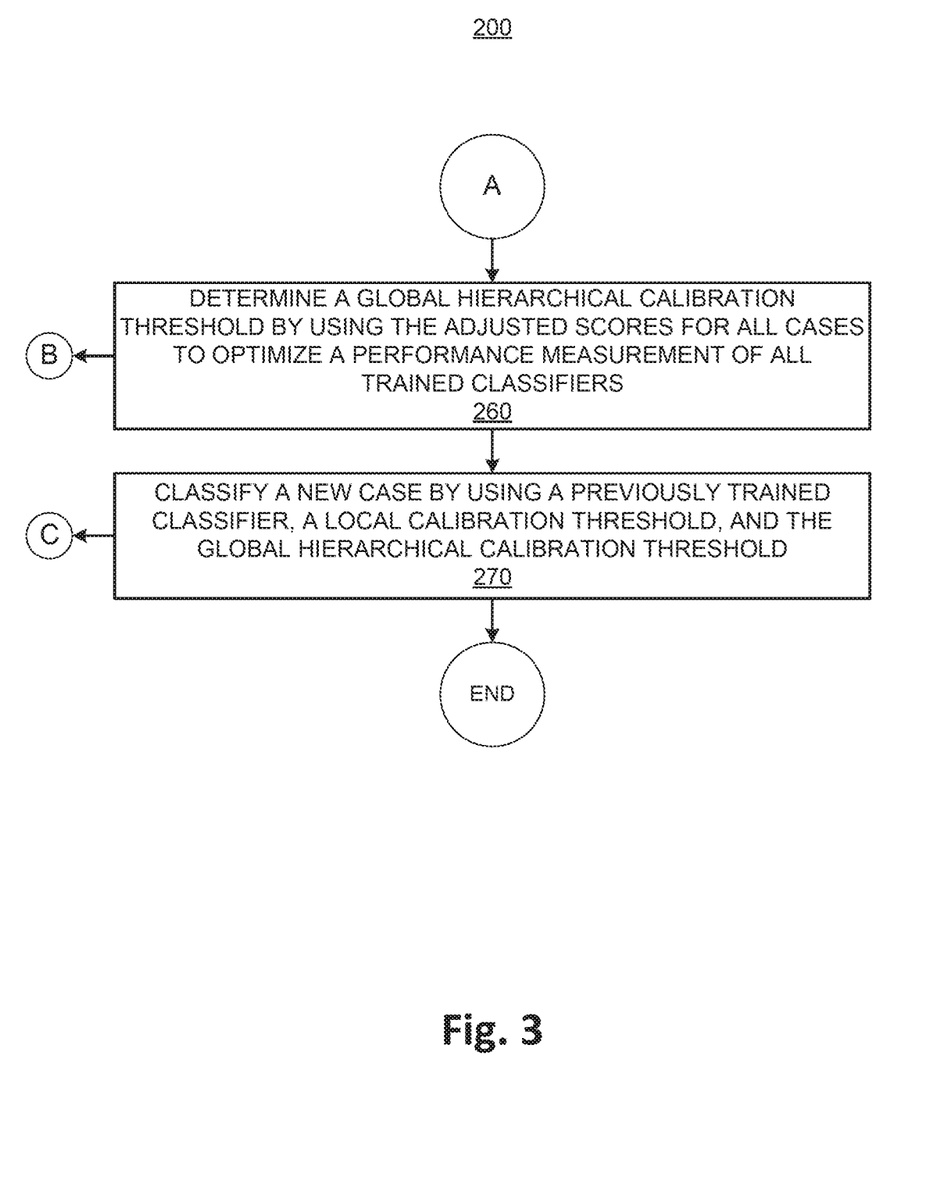

FIGS. 2 and 3 illustrate a flowchart showing an example of a method 200 for training and optimizing a classifier and classifying a new case. Although execution of the method 200 is described below with reference to the system 10, the components for executing the method 200 may be spread among multiple devices/systems. The method 200 may be implemented in the form of executable instructions stored on a machine-readable storage medium, and/or in the form of electronic circuitry.

In one example, the method 200 can be executed by at least one processor of a computing device (e.g., processor 102 of device 100). In other examples, the method may be executed by another processor in communication with the system 10. Various elements or blocks described herein with respect to the method 200 are capable of being executed simultaneously, in parallel, or in an order that differs from the illustrated serial manner of execution. The method 200 is also capable of being executed using additional or fewer elements than are shown in the illustrated examples.

In executing the method 200, a processor may analyze a main training set (e.g., 155) to train a classifier for each of plurality of classes. For instance, the main training set 155 may be obtained from a data corpus 150 (e.g., data regarding customer support logs—keyboard issue logs, email issue logs, etc.). In one example, the main training set 155 includes a plurality of classes, where each of the plurality of classes is associated with a set of labeled cases. For example, various cases in the training dataset may be labeled (e.g., by user, by a machine, etc.) as specific examples of classes or categories of the data 150 (e.g., keyboard issues class, email issues class, etc.). In some implementations, the main training dataset 155 may include any number of classes.

The main training set 155 may be a multi-class training set (i.e., it may include examples of different classes). The main training set 155 may also be a multi-label set (i.e., one case may be labeled or associated with more than one class) and/or a hierarchical set (i.e., cases may show hierarchical relationship between classes). Thus, each of the cases (e.g. documents or arbitrary objects with feature values) in the main training set may be labeled with a set classes. In many multi-label situations, most cases may be labeled with just one class, but occasionally may be labeled with multiple classes. In addition, the data corpus 150 may also include a plurality of unlabeled cases (e.g., target cases that may need to be classified). The data corpus 150 may further include a global decision threshold (for some applications, a score of 0 is considered the global decision threshold; in others, a score of 0.5 is used instead). The global decision threshold may be a fixed threshold that is used to determine whether a case belongs to a class (e.g., if a score for the class is greater than or equal to the global decision threshold, a processor may classify a case under that class). In other examples, the global decision threshold may not be stored in the data corpus 150 but may be otherwise provided to a processor.

The method 200 begins at 210, where a processor may perform several operations for each class from a plurality of classes. For example, at 220, the processor may construct a binary training set for the class, where the binary training set includes labeled cases for that class from the main training set 155 and other labeled cases from the main training set 155. The other labeled cases in the main training set 155 may be cases labeled for different classes. In one implementation, the binary training set includes all training cases in the main training set that are labeled for that class. In another implementation, not all labeled cases from the main training set 155 are included in the binary training set. The binary training set for each class may further include available unlabeled cases (e.g., from a group of unlabeled cases in the data corpus 150), where some or all unlabeled cases may be used. In some situations, the binary training set for each class may exclude the unlabeled cases in the data corpus 150. In constructing the binary training set for each class, the labeled cases for each class in the main training set are identified as positive examples in the binary training set for that class, and the labeled cases for other classes in the main training set and the available unlabeled cases are identified as negative examples in the binary training set for that class.

At 230, the processor may train a classifier for the class on the binary training set. Trained the classifier may include any type of classifier technology (e.g., Naive Bayes, Support Vector Machines, Neural Networks, etc.) and may also include fixed parameters (Naive Bayes with Laplace smoothing greater than 0.5; Support Vector Machines with a cost parameter greater than 1000; Neural Networks with a neuron depth greater than three, etc.).

At 240, the processor may compute a local calibration threshold using scores of the labeled cases in the binary training set. In other words, the processor may recalibrate the scores of the labeled cases in the binary training set for each class in order to determine a local calibration threshold for that class. Various techniques may be used to compute the local calibration threshold for each class: 1) the minimum score of the positives; 2) the score that yields the minimum error (e.g., trying all possible thresholds and selecting the one with the minimal error that eliminate most of the negative on the training set T); 3) the score that yields the minimum cost, given a predetermined False Positive cost and False Negative cost; 4) the score that yields the best value of some given performance objective function (e.g., F-measure, Jaccard accuracy, etc.); 5) instead of using the classifier scores directly, a processor may use thresholds between scores (e.g., the midpoint between adjacent scores (whether for a positive or a negative case)).

Before computing the local calibration threshold for each class, the processor may score the cases in the binary training set for that class. While scoring the cases in the binary training set for a class, the processor may exclude any unlabeled cases in the binary training set for that class. In other words, the processor may only score the labeled cases from the main training set 155 that were included in the binary training set for that class. In one example, the processor may apply the trained classifier for that class to the labeled cases in the binary training set for the class to generate the scores for the cases in the binary training set. The calculated scores may be very low (i.e., all far below the global decision threshold) because the processor included the unlabeled cases as negative examples during training of the classifier. In other words, some of the unlabeled cases may belong to the known classes in the main training set 155, but the classifier for that class was trained as showing them as being negative. Thus, the scores of the cases in the binary training set for that class could be low.

At 250, the processor may adjust all scores of the labeled cases in the binary training set with the local calibration threshold (for that class) to meet a global decision threshold (e.g., the global decision threshold received from the data corpus 150 or inputted from a user via the interface 160). Since the scores of the labeled cases in the binary training for the class may all be below the global decision threshold, the processor may use the local calibration threshold for that class to adjust them. In one example, the processor may simply add the local calibration threshold to the raw score. In another example, the processor may map the raw score through a two-part piecewise-linear map. Other techniques may also be used.

Next, the processor may determine a global hierarchical calibration threshold by using the adjusted scores for all classes to optimize a performance measurement of all trained classifiers (at 260). In other words, in blocks 210-250, the processor optimizes each individual classifier for each class. However, considering that the entire data corpus may include multiple classes, in 260, the processor determines a global hierarchical calibration threshold that may be used to optimize the performance of all trained classifiers by using the scores for all classes and all cases. In one example, the processor may consider various global hierarchical calibration thresholds before determining which is the most accurate threshold for the system. Specific details about the process of determining a global hierarchical calibration threshold are described below in relation to FIG. 4.

With continued reference to FIGS. 2-3, the processor may next classify a new case by using a previously trained classifier, a local calibration threshold, and the global hierarchical calibration threshold (at 270). In other words, in order to classify a new case (e.g., received from the data corpus 150), the processor may use at least one available classifier, the corresponding local calibration threshold for the class, and the global hierarchical calibration threshold determined in 260. As a result, the processor may classify each new case in at least one class (i.e., each new case may be classified for each class by using a previously trained classifier for the class). In addition, the processor may calculate classification scores for each new case (e.g., how the new case scores in view of the known classes that have an existing classifier). Specific details about the process of classifying a new case are described below in relation to FIG. 5.

Figure 4:
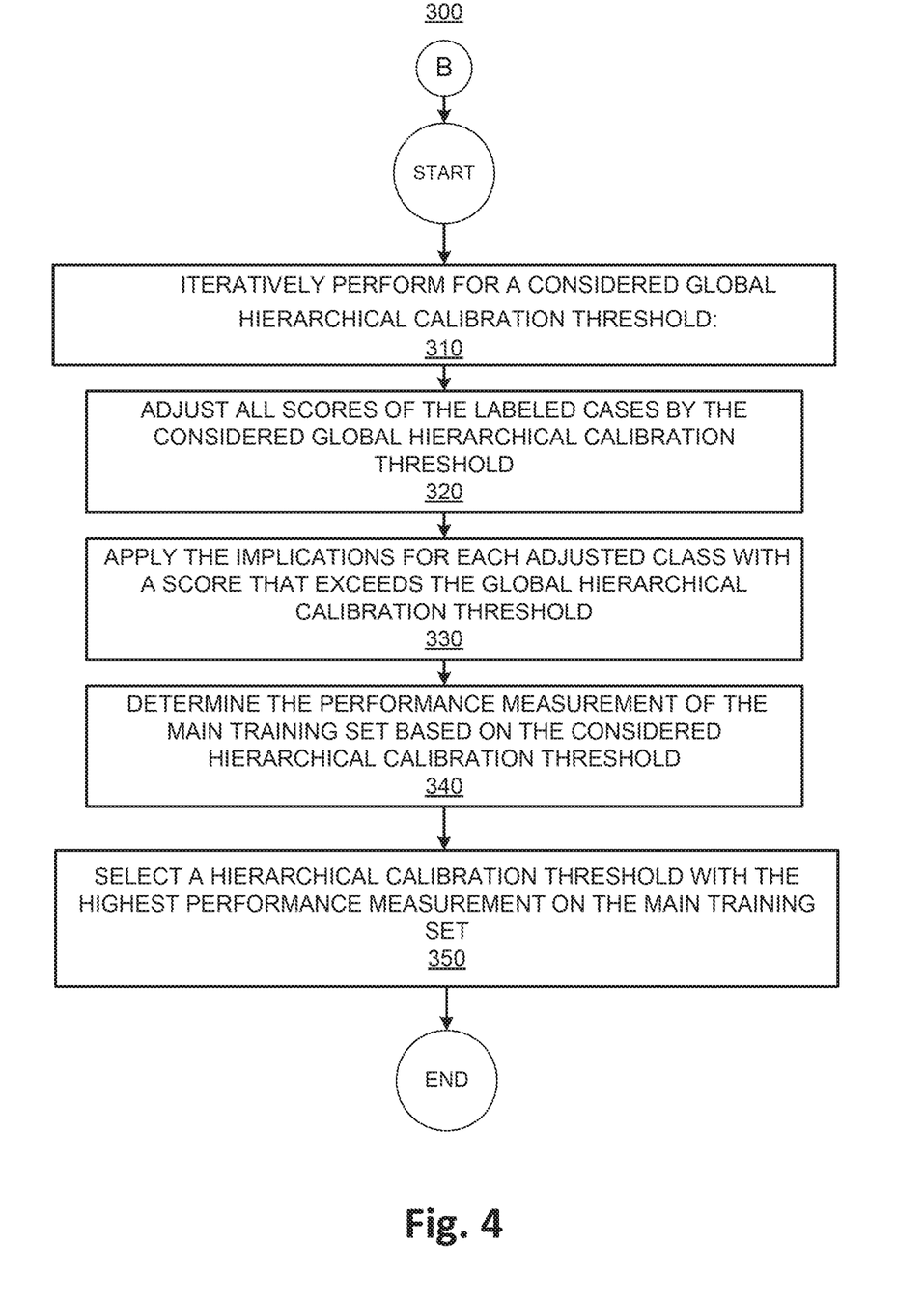
FIG. 4 illustrates a flowchart showing an example of a method for determining a global hierarchical calibration threshold in accordance with an implementation of the present disclosure.

FIG. 4 illustrates a flowchart showing an example of a method 300 for determining a global hierarchical calibration threshold. Although execution of the method 300 is described below with reference to the system 10, the components for executing the method 300 may be spread among multiple devices/systems. The method 300 may be implemented in the form of executable instructions stored on a machine-readable storage medium, and/or in the form of electronic circuitry. In one example, the method 300 can be executed by at least one processor of a computing device (e.g., processor 102 of device 100).

Prior to executing the method 330, a processor may determine, for each class, a set of other classes that are implied by that class. In other words, the processor may identify the class or set of classes that are always implied by each class when that class is identified. If hierarchical information for each class is provided as an input, then the set of other classes that are implied by a class includes that class itself and all its ancestors. If, on the other hand, hierarchical information for each class is not provided as an input, the set of other classes that are implied by a class may be inferred from the main training set 155 (e.g., by reviewing the class labels in the main training set).

The method 300 begins at 310, where at least one processor may iteratively perform several operations (e.g., 320-340) for each considered global hierarchical calibration threshold. The processor may iterate the operations described below over each labeled case in the main training set 155. Thus, a processor may evaluate several global hierarchical calibration thresholds (e.g., received as an input or from the data corpus 150).

At 320, the processor may adjust all scores of the labeled cases by the considered global hierarchical calibration threshold. In other words, the processor may adjust the scores of the labeled cases for all classes by the specific global hierarchical calibration threshold that is being considered.

Next, the processor may apply the implications for each adjusted class with a score that exceeds the global decision threshold (at 330). In one implementation, when the scores of the labeled cases for a class exceed the global decision threshold, the processor identifies set of other classes that are implied by that class and applies them to the class. For example, when the scores of the labeled cases for the implied classes are not greater than or equal to the global decision threshold, the processor may adjust/increase these scores so they ultimately meet the global decision threshold (e.g., by setting them exactly to the global decision threshold or to a score higher than the global decision threshold, such as the score of the implying (predicate) class).

At 340, the processor may determine the performance measurement of the main training set based on the considered hierarchical calibration threshold. In other words, the processor may optimize the performance measurement of all trained classifiers. There are a variety of ways to measure multi-class performance over the main training set 155. In some examples, the performance measurement of the main training set in view of the hierarchical calibration threshold may be determined by the accuracy or error rate of all the predictions for all the classes in view of the main training set. In some implementations, the processor may use Hamming distance or accuracy, where in other implementation Jaccard similarity of the predicted set of classes vs. the main training set of classes may be used.

Next, the processor may select a global hierarchical calibration threshold with the highest performance measurement on the main training set (at 350). In other words, the processor may determine which proposed global hierarchical calibration threshold has the best consistency with the actual labels of the classes in the training set. That global hierarchical calibration threshold is identified to have the highest performance measurement when it most accurately matches cases to classes in the training date set.

Figure 5:
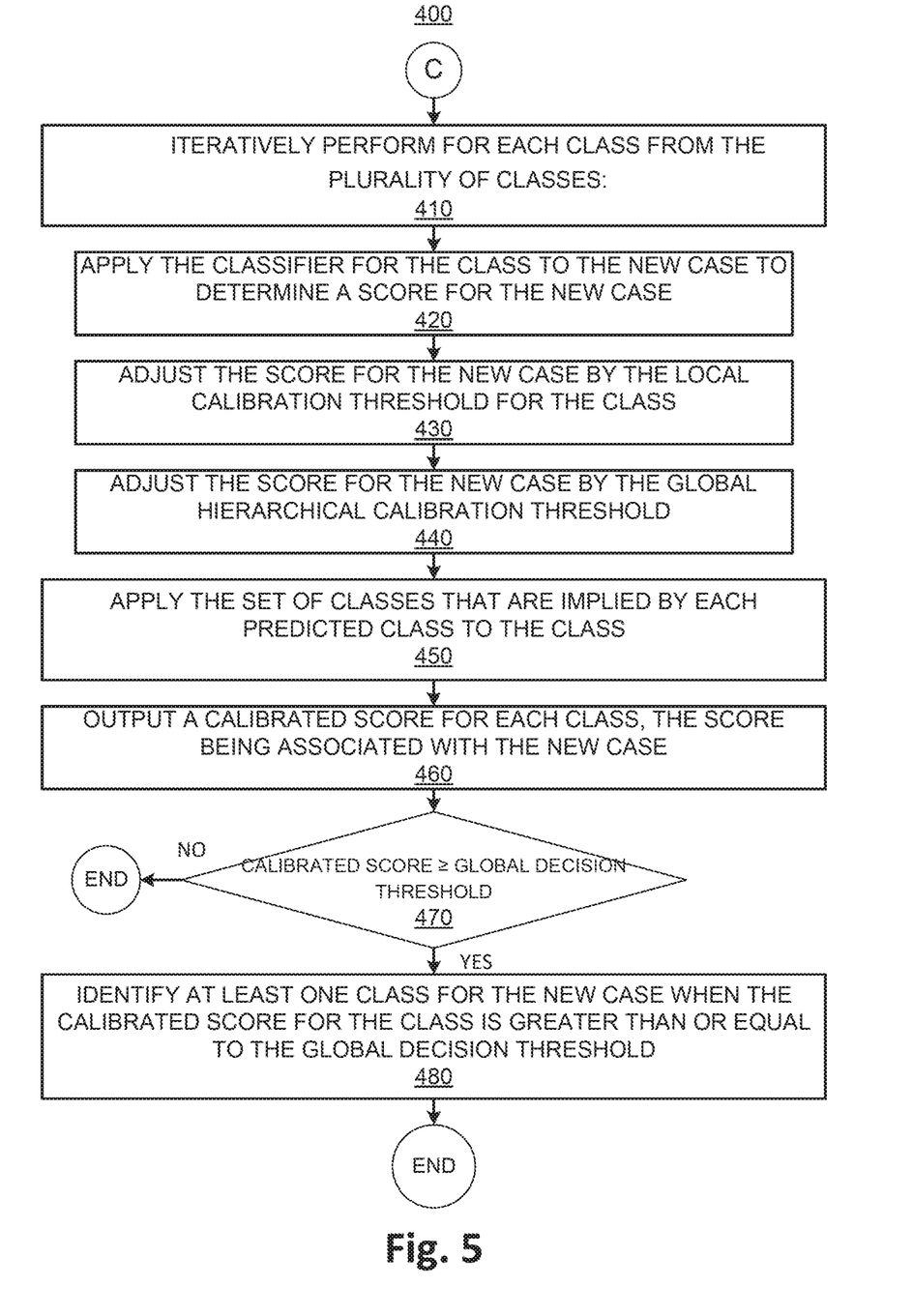
FIG. 5 illustrates a flowchart showing an example of a method for classifying a new case in accordance with an implementation of the present disclosure.

FIG. 5 illustrate a flowchart showing an example of a method 400 for classifying a new case. Although execution of the method 400 is described below with reference to the system 10, the components for executing the method 400 may be spread among multiple devices/systems. The method 400 may be implemented in the form of executable instructions stored on a machine-readable storage medium, and/or in the form of electronic circuitry. In one example, the method 400 can be executed by at least one processor of a computing device (e.g., processor 102 of device 100).

The method 400 begins at 410, where for each evaluated new case, at one processor may iteratively perform operations 420-440 for each class from the plurality of classes. At 420, the processor may apply the classifier for the class to the new case to determine a score for the new case. Thus, the processor calculates a score for the new case. At 430, the processor may adjust the score for the new case by the local calibration threshold for the class. Thus, the processor may perform a local calibration for the new case. At 440, the processor may adjust the score for the new case by the global hierarchical calibration threshold. Thus, the processor may perform a global calibration by for the new case.

Next, the processor may apply the set of classes that are implied by each predicted class to the class (at 450). In other words, the processor may update the related classes for each class by the previously identified classes which are implied by that class. At 460, the processor may output a calibrated score for each class, the score being associated with the new case. In other words, for each new case, the processor may calculate a calibrated score for each separate class (e.g., the classes that were identified in the main training set 155).

At 470, the processor may compare the calibrated score of the new case for each class to the global decision threshold. If the score for a class is less than the global decision threshold, the processor determines that the new case is not associated with that class, ends the analysis for the class, and moves to the next class. If, on the other hand, the processor determines that score for a class is greater than or equal to the global decision threshold, the processor identifies at least one class for the new case (at 480). In other words, the processor may classify each new case in at least one class. Alternatively, the processor may determine a set of new classes for the new case (e.g., if the new case fits under several classes). In addition, the processor may return a report with all scores (associated with all cases from 155) for the new case. In another implementation, none of the calibrated scores for the classes may exceed the global decision threshold. In that case, zero classes may be selected for the new case (i.e., the classifier balks on the case, refusing to include it in any known class).

Figure 6:
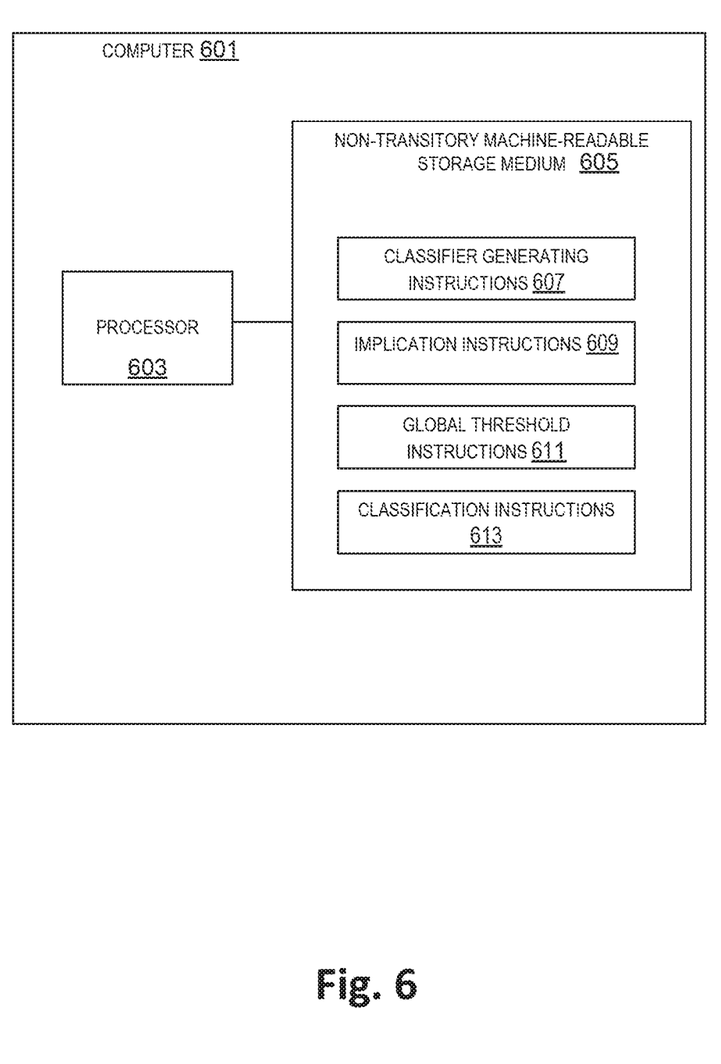
FIG. 6 is an example block diagram illustrating a computer-readable medium in accordance with an implementation of the present disclosure.

FIG. 6 illustrates a computer 601 and a non-transitory machine-readable medium 605 according to an example. In one example, the computer 601 maybe similar to the computing device 100 of the system 10 or may include a plurality of computers. For example, the computer may be a server computer, a workstation computer, a desktop computer, a laptop, a mobile device, or the like, and may be part of a distributed system. The computer may include one or more processors and one or more machine-readable storage media. In one example, the computer may include a user interface (e.g., touch interface, mouse, keyboard, gesture input device, etc.).

Computer 601 may perform methods 200-400 and variations thereof. Additionally, the functionality implemented by computer 601 may be part of a larger software platform, system, application, or the like. Computer 601 may be connected to a database (not shown) via a network. The network may be any type of communications network, including, but not limited to, wire-based networks (e.g., cable), wireless networks (e.g., cellular, satellite), cellular telecommunications network(s), and IP-based telecommunications network(s) (e.g., Voice over Internet Protocol networks). The network may also include traditional landline or a public switched telephone network (PSTN), or combinations of the foregoing.

The computer 601 may include a processor 603 and non-transitory machine-readable storage medium 605. The processor 603 (e.g., a central processing unit, a group of distributed processors, a microprocessor, a microcontroller, an application-specific integrated circuit (ASIC), a graphics processor, a multiprocessor, a virtual processor, a cloud processing system, or another suitable controller or programmable device) and the storage medium 605 may be operatively coupled to a bus. Processor 603 can include single or multiple cores on a chip, multiple cores across multiple chips, multiple cores across multiple devices, or combinations thereof.

The storage medium 605 may include any suitable type, number, and configuration of volatile or non-volatile machine-readable storage media to store instructions and data. Examples of machine-readable storage media in include read-only memory ("ROM"), random access memory ("RAM") (e.g., dynamic RAM ["DRAM"], synchronous DRAM ["SDRAM"], etc.), electrically erasable programmable read-only memory ("EEPROM"), magnetoresistive random access memory (MRAM), memristor, flash memory, SD card, floppy disk, compact disc read only memory (CD-ROM), digital video disc read only memory (DVD-ROM), and other suitable magnetic, optical, physical, or electronic memory on which software may be stored.

Software stored on the non-transitory machine-readable storage media 605 and executed by the processor 603 includes, for example, firmware, applications, program data, filters, rules, program modules, and other executable instructions. The processor 603 retrieves from the machine-readable storage media 605 and executes, among other things, instructions related to the control processes and methods described herein.

The processor 603 may fetch, decode, and execute instructions 607-613 among others, to implement various processing. As an alternative or in addition to retrieving and executing instructions, processor 603 may include at least one integrated circuit (IC), other control logic, other electronic circuits, or combinations thereof that include a number of electronic components for performing the functionality of instructions 607-613. Accordingly, processor 603 may be implemented across multiple processing units and instructions 607-613 may be implemented by different processing units in different areas of computer 601.

The instructions 607-613 when executed by processor 603 (e.g., via one processing element or multiple processing elements of the processor) can cause processor 603 to perform processes, for example, methods 200-400, and/or variations and portions thereof. In other examples, the execution of these and other methods may be distributed between the processor 603 and other processors in communication with the processor 603.

For example, classifier generating instructions 607 may cause processor 603 to perform the following operations for each class from a plurality of classes: 1) construct a binary training set the class, the binary training set including labeled cases for that class from the main training set and other labeled cases from the main training set; 2) train a classifier for the class on the binary training set; 3) compute a local calibration threshold using scores of the labeled cases in the binary training set; and 4) adjust all scores of the labeled cases in the binary training set with the local calibration threshold to meet a global decision threshold. These instructions may function similarly to the techniques described in blocks 210-220 of method 200 and to the techniques described in method 300.

Implication instructions 609 may cause the processor 603 to determine, for each class, a set of other classes that are implied by that class. These instructions may function similarly to the techniques described prior describing the method 300.

Global threshold instructions 611 may cause the processor 603 to determine a global hierarchical calibration threshold by using the adjusted scores for all classes to optimize a performance measurement of all trained classifiers. In one example, instructions 611 may cause the processor 603 to perform the following for a considered global hierarchical calibration threshold; 1) adjust all scores of the labeled cases by the considered global hierarchical calibration threshold; 2) apply the implications for each adjusted class with a score that exceeds the global decision threshold; and 3) determine the performance measurement of the main training set based on the considered hierarchical calibration threshold. Instructions 611 may cause the processor 603 to select a hierarchical calibration threshold with the highest performance measurement on the main training set. These instructions may function similarly to the techniques described in block 260 of method 200 and in the method 300.

Classification instructions 613 may cause the processor 603 to classify a new case by using a previously trained classifier, a local calibration threshold, and the global hierarchical calibration threshold. In one example, instructions 613 may cause the processor 603 to iteratively perform the following for each class from the plurality of classes; 1) calculate a score for the new case by applying the classifier for the class to the new case; 2) perform a local calibration by adjusting the score for the new case by the local calibration threshold for the class; and 3) perform a global calibration by adjusting the score for the new case by the global hierarchical calibration threshold. Instructions 613 may further cause the processor 603 to; apply the set of classes that are implied by each predicted class to the class, output a calibrated score for each class, the score being associated with the new case, compare the calibrated score of the new case for each class to the global decision threshold, and identify at least one class for the new case when the calibrated score for the class is greater than or equal to the global decision threshold. These instructions may function similarly to the techniques described in block 270 of method 200 and in the method 400.

In the foregoing description, numerous details are set forth to provide an understanding of the subject matter disclosed herein. However, implementations may be practiced without some or all of these details. Other implementations may include modifications and variations from the details discussed above. It is intended that the appended claims cover such modifications and variations.

What is claimed is:

1. A method comprising, by a processor:
   performing, with the processor, for each class from a plurality of classes, wherein each class is associated with a set of labeled cases in a main training set:
       constructing a binary training set for the class, the binary training set including labeled cases for that class from the main training set and other labeled cases from the main training set,
       training a classifier for the class on the binary training set,
       computing a local calibration threshold using scores of the labeled cases in the binary training set, and
       adjusting all scores of the labeled cases in the binary training set with the local calibration threshold to meet a global decision threshold;
   determining, with the processor, a global hierarchical calibration threshold by using the adjusted scores of the labeled cases for all classes to optimize a performance measurement of all trained classifiers; and
   classifying, with the processor, a new case by using a previously trained classifier, a local calibration threshold, and the global hierarchical calibration threshold.

2. The method of claim 1, wherein the binary training set for each class further includes available unlabeled cases, and wherein the labeled cases for each class in the main training set are identified as positive examples in the binary training set for that class, and the labeled cases for other classes in the main training set and the available unlabeled cases are identified as negative examples in the binary training set for that class.

3. The method of claim 1, further comprising: scoring, with the processor, the labelled cases in the binary training set for each class, and excluding any unlabeled cases in the binary training set for that class.

4. The method of claim 1, further comprising: for each class, determining, with the processor, a set of other classes that are implied by that class.

5. The method of claim 4, wherein determining the global hierarchical calibration threshold comprises:
iteratively performing, with the processor, for a considered global hierarchical calibration threshold:
adjusting all scores of the labeled cases by the considered global hierarchical calibration threshold,
applying implications for each adjusted class with a score that exceeds the global decision threshold, and
determining the performance measurement of all trained classifiers of the main training set based on the considered global hierarchical calibration threshold; and
selecting, with the processor, a hierarchical calibration threshold with a highest performance measurement on the main training set.

6. The method of claim 4, wherein classifying a new case comprises:
iteratively performing, with the processor, for each class from the plurality of classes:
applying the classifier for the class to the new case to determine a score for the new case,
adjusting the score for the new case by the local calibration threshold for the class, and
adjusting the score for the new case by the global hierarchical calibration threshold;
applying, with the processor, a set of classes that are implied by predicted each class to the class; and
outputting, with the processor, a calibrated score for each class, the score being associated with the new case.

7. The method of claim 6, further comprising:
comparing, with the processor, the calibrated score of the new case for each class to the global decision threshold; and
identifying, with the processor, at least one class for the new case when the calibrated score for the class is greater than or equal to the global decision threshold.

8. A system comprising:
a classifier generating engine to perform for each class from a plurality of classes, wherein each class is associated with a set of labeled cases in a main training set:
generate a binary training set for the class, the binary training set including
labeled cases for that class from the main training set and other labeled cases from the main training set,
train a classifier for the class on the binary training set,
score the labeled cases in the binary training set excluding any unlabeled cases,
compute a local calibration threshold using scores of the labeled cases in the binary training set, and
adjust all scores of the labeled cases in the binary training set with the local calibration threshold to meet a global decision threshold;
a global hierarchical calibration threshold engine to determine a global hierarchical calibration threshold by using the adjusted scores of the labeled cases for all classes and to optimize a performance measurement of all trained classifiers; and a classification engine to classify a new case by using a previously trained classifier, a local calibration threshold, and the global hierarchical calibration threshold.

9. The system of claim 8, further comprising an implication engine to: for each class, determine a set of other classes that are implied by that class.

10. The system of claim 9, wherein the global hierarchical calibration threshold engine is further to:
iteratively perform for a considered global hierarchical calibration threshold:
adjust all scores of the labeled cases by the considered global hierarchical calibration threshold,
apply implications for each adjusted class with a score that exceeds the global decision threshold, and
determine the performance measurement of all trained classifiers of the main training set based on the considered global hierarchical calibration threshold; and
select a hierarchical calibration threshold with a highest performance measurement on the main training set.

11. The system of claim 9, wherein the classification engine is further to:
iteratively perform for each class from the plurality of classes:
calculate a score for the new case by applying the classifier for the class to the new case,
perform a local calibration by adjusting the score for the new case by the local calibration threshold for the class, and
perform a global calibration by adjusting the score for the new case by the global hierarchical calibration threshold;
apply a set of classes that are implied by predicted each class to the class;
output a calibrated score for each class, the score being associated with the new case;
compare the calibrated score of the new case for each class to the global decision threshold; and
identify at least one class for the new case when the calibrated score for the class is greater than or equal to the global decision threshold.

12. A non-transitory machine-readable storage medium encoded with instructions executable by at least one processor, the machine-readable storage medium comprising instructions to:
perform for each class from a plurality of classes, wherein each class is associated with a set of labeled cases in a main training set:
construct a binary training set for the class, the binary training set including labeled cases for that class from the main training set and other labeled cases from the main training set,
train a classifier for the class on the binary training set,
compute a local calibration threshold using scores of the labeled cases in the binary training set,
adjust all scores of the labeled cases in the binary training set with the local calibration threshold to meet a global decision threshold;
determine, for each class, a set of other classes that are implied by that class;
determine a global hierarchical calibration threshold by using the adjusted scores of the labeled cases for all classes to optimize a performance measurement of all trained classifiers; and
classify a new case by using a previously trained classifier, a local calibration threshold, and the global hierarchical calibration threshold.

13. The non-transitory machine-readable storage medium of claim 12, further comprising instructions to:
  iteratively perform for a considered global hierarchical calibration threshold:
    adjust all scores of the labeled cases by the considered global hierarchical calibration threshold,
    apply implications for each adjusted class with a score that exceeds the global decision threshold, and
    determine the performance measurement of all trained classifiers of the main training set based on the considered global hierarchical calibration threshold; and
  select a hierarchical calibration threshold with a highest performance measurement on the main training set.

14. The non-transitory machine-readable storage medium of claim 12, further comprising instructions to:
  iteratively perform for each class from the plurality of classes:
    calculate a score for the new case by applying the classifier for the class to the new case,
    perform a local calibration by adjusting the score for the new case by the local calibration threshold for the class, and
    perform a global calibration by adjusting the score for the new case by the global hierarchical calibration threshold;
  apply a set of classes that are implied by each predicted class to the class;
  output a calibrated score for each class, the score being associated with the new case;
  compare the calibrated score of the new case for each class to the global decision threshold; and
  identify at least one class for the new case when the calibrated score for the class is greater than or equal to the global decision threshold.

15. The non-transitory machine-readable storage medium of claim 12, wherein the binary training set for each class further includes available unlabeled cases, and wherein the labeled cases for each class in the main training set are identified as positive examples in the binary training set for that class, and the labeled cases for other classes in the main training set and the available unlabeled cases are identified as negative examples in the binary training set for that class.

* * * * *